United States Patent
Bojiuc

(10) Patent No.: US 7,348,703 B2
(45) Date of Patent: Mar. 25, 2008

(54) MONOPOLE FIELD ELECTRIC MOTOR-GENERATOR WITH SWITCHABLE COIL CONFIGURATION

(76) Inventor: Dumitru Bojiuc, 47 Water Ridge Ct., Dana Point, CA (US) 92629

( * ) Notice: Subject to any disclaimer, the term of this patent is extended or adjusted under 35 U.S.C. 154(b) by 28 days.

(21) Appl. No.: 11/210,044

(22) Filed: Aug. 22, 2005

(65) Prior Publication Data

US 2006/0038460 A1 Feb. 23, 2006

Related U.S. Application Data

(63) Continuation-in-part of application No. 11/200,920, filed on Aug. 9, 2005.

(60) Provisional application No. 60/603,444, filed on Aug. 20, 2004.

(51) Int. Cl.
| | |
|---|---|
| H02K 21/48 | (2006.01) |
| H02K 21/26 | (2006.01) |
| H02K 19/26 | (2006.01) |
| H02K 16/04 | (2006.01) |
| H02P 9/00 | (2006.01) |
| H02K 21/24 | (2006.01) |

(52) U.S. Cl. .......... 310/154.02; 310/164; 310/195; 310/200; 310/268; 322/90

(58) Field of Classification Search .......... 310/156.32, 310/154.02, 154.33, 164, 200, 268, 195; 322/63, 69, 71, 90, 93; 318/81
See application file for complete search history.

(56) References Cited

U.S. PATENT DOCUMENTS

| | | | |
|---|---|---|---|
| 1,882,162 A | * | 10/1932 | Rosenberg .................. 310/188 |
| 2,080,388 A | * | 5/1937 | Langkau et al. ............. 310/188 |
| 3,308,363 A | * | 3/1967 | Rawcliffe et al. ........... 318/773 |
| 3,465,186 A | * | 9/1969 | Armstrong et al. ......... 310/158 |
| 3,508,138 A | * | 4/1970 | Schatz ......................... 322/90 |
| 3,590,293 A | * | 6/1971 | Susdorf ....................... 310/94 |
| 4,459,501 A | | 7/1984 | Fawzy |
| 4,565,938 A | | 1/1986 | Fawzy |
| 4,623,809 A | | 11/1986 | Westley |
| 4,719,380 A | * | 1/1988 | Smith et al. ................. 310/114 |
| 5,191,255 A | | 3/1993 | Kloosterhouse et al. |
| 5,278,470 A | * | 1/1994 | Neag ........................... 310/178 |
| 5,334,899 A | * | 8/1994 | Skybyk ...................... 310/268 |
| 5,337,030 A | | 8/1994 | Mohler |

(Continued)

FOREIGN PATENT DOCUMENTS

| | | | |
|---|---|---|---|
| GB | 2050706 | * | 1/1981 |
| JP | 5-344778 | * | 12/1993 |

*Primary Examiner*—Burton Mullins
(74) *Attorney, Agent, or Firm*—Gene Scott; Patent Law & Venture Group

(57) ABSTRACT

A pair of stators produce a magnetic field within a space between them a ferromagnetic toroidal rotor is rotationally mounted within the magnetic field. A plurality of windings are wound radially on the rotor and each winding provides a plurality of coils. Each of coils is interconnected through a switch, the switch configured for placing each of the coils within each winding alternatively in one of an electrical series connection, an electrical parallel connection, and an electrically isolated connection, so that when operated as a generator, a selected output voltage and current are produced by rotor rotation and when operated as a motor a selected output speed and torque are produced.

10 Claims, 3 Drawing Sheets

U.S. PATENT DOCUMENTS

| | | | |
|---|---|---|---|
| 5,625,276 A * | 4/1997 | Scott et al. | 322/24 |
| 6,064,135 A * | 5/2000 | Hahn | 310/268 |
| 6,333,578 B1 * | 12/2001 | Nakamura et al. | 310/166 |
| 6,507,257 B2 | 1/2003 | Mohler | |
| 6,664,689 B2 * | 12/2003 | Rose | 310/156.32 |
| 6,794,783 B2 * | 9/2004 | Tu et al. | 310/156.32 |
| 6,803,691 B2 * | 10/2004 | Rose | 310/156.32 |
| 6,812,609 B2 * | 11/2004 | Anwander | 310/156.55 |
| 2002/0084705 A1 * | 7/2002 | Kawamura et al. | 310/68 R |
| 2002/0135263 A1 | 9/2002 | Neal | |
| 2004/0135452 A1 | 7/2004 | Tu et al. | |

* cited by examiner

MONOPOLE FIELD ELECTRIC MOTOR-GENERATOR WITH SWITCHABLE COIL CONFIGURATION

RELATED APPLICATIONS

This application claims international priority from a prior filed U.S. Provisional Patent Application having U.S. Ser. No. 60/603,444 filed with the United States Patent Office on Aug. 20, 2004 and which is copending with this present non-provisional application. U.S. Ser. No. 60/603,444 is hereby incorporated herein by reference. This application is a Continuation-In-Part application of a prior filed U.S. Utility patent application having Ser. No. 11200920 and entitled Monopole Field Electric Motor Generator filed on Aug. 9, 2005.

BACKGROUND

1. Field of the Present Disclosure

This disclosure relates generally to electric motor-generators and more particularly to such rotating electromagnetic machines having electronic switching of the rotating winding coil configuration.

2. Description of Related Art

The following art defines the present state of the field of the apparatus described and claimed herein:

Tu et al, US 2004/0135452, discloses a flat rotary electric generator that includes at least one toroidal coil structure for cutting magnetic lines to induce a current and at least one disc-shaped magnetic pole structure oriented parallel to the helical coil structure. If multiple toroidal coil structures and disc-shaped magnetic coil structures are included, the toroidal coil structures and disc-shaped magnetic coil structures are arranged in alternating manner. The toroidal coil structure and disc-shaped magnetic pole structure are not provided with a permeable material. When either the toroidal coil structures or the at least one disc-shaped magnetic pole structure is rotated by an external force, the toroidal coil structure cuts the magnetic lines passing therethrough to generate an induced current. Neal, US 2002/0135263, discloses a plurality of stator arc segments that form a toroidal core for a stator assembly used to make a motor. In a preferred embodiment, a plurality of magnetic fields is created when electrical current is conducted through wire wound around poles on the toroidal core. A monolithic body of phase change material substantially encapsulates the conductors and holds the stator arc segments in contact with each other in the toroidal core. Hard disc drives using the motor, and methods of constructing the motor and hard disc drives are also disclosed. Rose, U.S. Pat. No. 6,803,691, discloses an electrical machine that comprises a magnetically permeable ring-shaped core centered on an axis of rotation and having two axially-opposite sides. Coils are wound toroidally about the core and disposed sequentially along the circumferential direction. Each coil includes two side legs extending radially alongside respectively sides of the core. Coil-free spaces exist between adjacent side legs. A bracket has first and second side flanges that are connected by a bridging structure and respectively about the first and second sides of the coil. Mohler, U.S. Pat. No. 6,507,257, discloses a bi-directional latching actuator that is comprised of an output shaft with one or more rotors fixedly mounted thereon. The shaft and rotor are mounted for rotation in a magnetically conductive housing having a cylindrical coil mounted therein and is closed by conductive end caps. The end caps have stator pole pieces mounted thereon. In one embodiment, the rotor has at least two oppositely magnetized permanent magnets which are asymmetrically mounted, i.e., they are adjacent at one side and separated by a non-magnetic void on the other side. The stator pole piece has asymmetric flux conductivity and in one embodiment is axially thicker than the remaining portion of the pole piece. An abutment prevents the rotor from swinging to the neutral position (where the rotor magnets are axially aligned with the higher conductivity portion of the pole piece). Thus, the rotor is magnetically latched in one of two positions being drawn towards the neutral position. Energization of the coil with an opposite polarity current causes the rotor to rotate towards its opposite latching position whereupon it is magnetically latched in that position. Mohler, U.S. Pat. No. 5,337,030, discloses a permanent magnet brushless torque actuator that is comprised of an electromagnetic core capable of generating an elongated toroidally shaped magnet flux field when energized. Outside the generally cylindrical coil is an outer housing with upper and lower end plates at each end. Mounted to the end plates and extending towards each other are stator pole pieces separated from its opposing pole piece by an air gap. A permanent magnet rotor is disposed in the air gap and mounted on a shaft which in turn is rotatably mounted in each of the end plates. The permanent magnet rotor comprises at least two permanent magnets, each covering an arcuate portion of the rotor and having opposite polarities. Energization of the coil with current in one direction magnetizes the pole pieces such that each of the two pole pieces attracts one of the magnets of the rotor and repels the other magnet of the rotor resulting in a torque generated by the output shaft. Reversal of the current flow results in a reversal of the torque and rotation of the rotor in the opposite direction. Preferred embodiments are disclosed having multiple cells, i.e. a plurality of stator rotor stator combinations and/or cells in which there are a plurality of pole pieces at each stator pole plane. Kloosterhouse et al, U.S. Pat. No. 5,191,255, discloses an electromagnetic motor that includes a rotor having a plurality of magnets mounted along a perimeter of the rotor. Preferably, adjacent magnets have opposite poles facing outward. One or more electromagnets are disposed adjacent to the perimeter of the rotor so that as the rotor rotates, the magnets mounted on the rotor are carried near the poles of the electromagnets. Current is supplied to the electromagnets by a drive circuit in a predetermined phase relationship with the rotation of the rotor such that, for substantially all angular positions of the rotor, magnetic attraction and repulsion between the poles of the electromagnets and the magnets mounted on the rotor urge the rotor to rotate in a desired direction. Reflective material is mounted on the rotor in predetermined angular positions. The drive circuit includes a photosensitive device which produces a signal whose value varies according to whether the device is receiving light reflected from the reflective material. The signal is amplified to produce drive current for the electromagnets. Westley, U.S. Pat. No. 4,623,809, discloses a stepper motor housing a pole structure in which a pair of identical stator plates, each having a plurality of poles, are positioned back to back with the poles projecting in opposite directions, the stator plates being positioned between a pair of substantially identical stator cups, each stator cup having a plurality of poles projecting inwardly from a back wall with a peripheral side wall terminating in an outwardly extending flange. A major surface of each flange is in contact with a face on one of the stator plates so as to assure a low reluctance magnetic path. Fawzy, U.S. Pat. No. 4,565,938, discloses an electromechanical device which can be used as a motor or as a generator. The device has a housing, including bearing means to support a rotatable shaft. Disc magnet means are provided, and poled to have alternating polarity and are mounted on the shaft to define a rotor. The device includes at least one first pole shoe in contact with the magnet means, having a portion extending radially therefrom to define a virtual pole chamber, of a first polarity. Also included is at least one second pole shoe in contact with the magnet and having a portion extending radially therefrom to define a virtual pole chamber of the other polarity. A toroid stator is mounted on the housing and has windings thereon. The stator is positioned annularly around the disc magnets such that the virtual pole chambers of the first and second pole shoes surround portions of said windings with circumferentially alternating fields of alternating polarity. Means are provided for electrical contact with the stator to draw off current when the device is operated as a generator, or provide current to operate the device as a motor. Fawzy, U.S. Pat. No. 4,459,501, discloses an electromechanical device which can be used as a motor or as a generator that has a housing, including bearing means to support a rotatable shaft. A pair of disc magnets are poled to have opposite polarity on the two faces of each. The magnets are mounted face to face together on the shaft to define a rotor. The device includes at least one first pole shoe in contact with one face of each magnet, and having a portion extending radially therefrom to define, in its preferred form, a pair of virtual pole chambers, of the same polarity as said one face. Also included is at least one second pole shoe in contact with the other face of each magnet and having a portion extending radially therefrom to define in its preferred form a pair of virtual pole chambers of the same polarity as the other face. A toroid stator is mounted on the housing and has windings thereon. The stator is positioned annularly around the disc magnets such that the virtual pole chambers of the first and second pole shoes surround portions of said windings with circumferentially alternating fields of alternating polarity. Means for electrical contact with the stator draw off current when the device is operated as a generator, or provide current to operate the device as a motor.

Our prior art search with abstracts described above teaches rotating electromagnet machines; in both motor and generator forms. Thus, the prior art shows in Neal, a toroidal core with radial arc segments, in Fawzy, we see a N-N and S-S pole face adjacency, in Tu et al, a N-S and S-N pole adjacency with radial coil windings, in Rose, we find radially wound coils in sequence around a toroidal core and with permanent magnet segments with N-N and S-S adjacency. However, the prior art fails to teach a rotating electromagnetic machine that provides electromagnetic fields immersed in monopole permanent magnet fields of opposite polarities as is shown in the present apparatus.

The present disclosure distinguishes over the prior art providing heretofore unknown advantages as described in the following summary.

SUMMARY

This disclosure teaches certain benefits in construction and use which give rise to the objectives described below.

A pair of stators produce a magnetic field within a space between them. a ferromagnetic toroidal rotor is rotationally mounted within the magnetic field. A plurality of windings are wound radially on the rotor and each winding provides a plurality of coils. Each of coils is interconnected through a switch, the switch configured for placing each of the coils within each winding alternatively in one of an electrical series connection, an electrical parallel connection, and an electrically isolated connection, so that when operated as a generator, a selected output voltage and current are produced by rotor rotation and when operated as a motor a selected output speed and torque are produced.

A primary objective inherent in the above described apparatus and method of use is to provide advantages not taught by the prior art.

Another objective is to provide an electromagnetic rotating machine with superior control of its output parameters by using a novel coil switching technique and output parameter monitoring.

A further objective is to provide such a machine useful as an electric motor.

A further objective is to provide such a machine useful as an electric generator.

Other features and advantages of the described apparatus and method of use will become apparent from the following more detailed description, taken in conjunction with the accompanying drawings, which illustrate, by way of example, the principles of the presently described apparatus and method of its use.

BRIEF DESCRIPTION OF THE DRAWINGS

The accompanying drawings illustrate at least one of the best mode embodiments of the present apparatus and method of it use. In such drawings.

DETAILED DESCRIPTION

The above described drawing figures illustrate the described apparatus and its method of use in at least one of its preferred, best mode embodiments, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
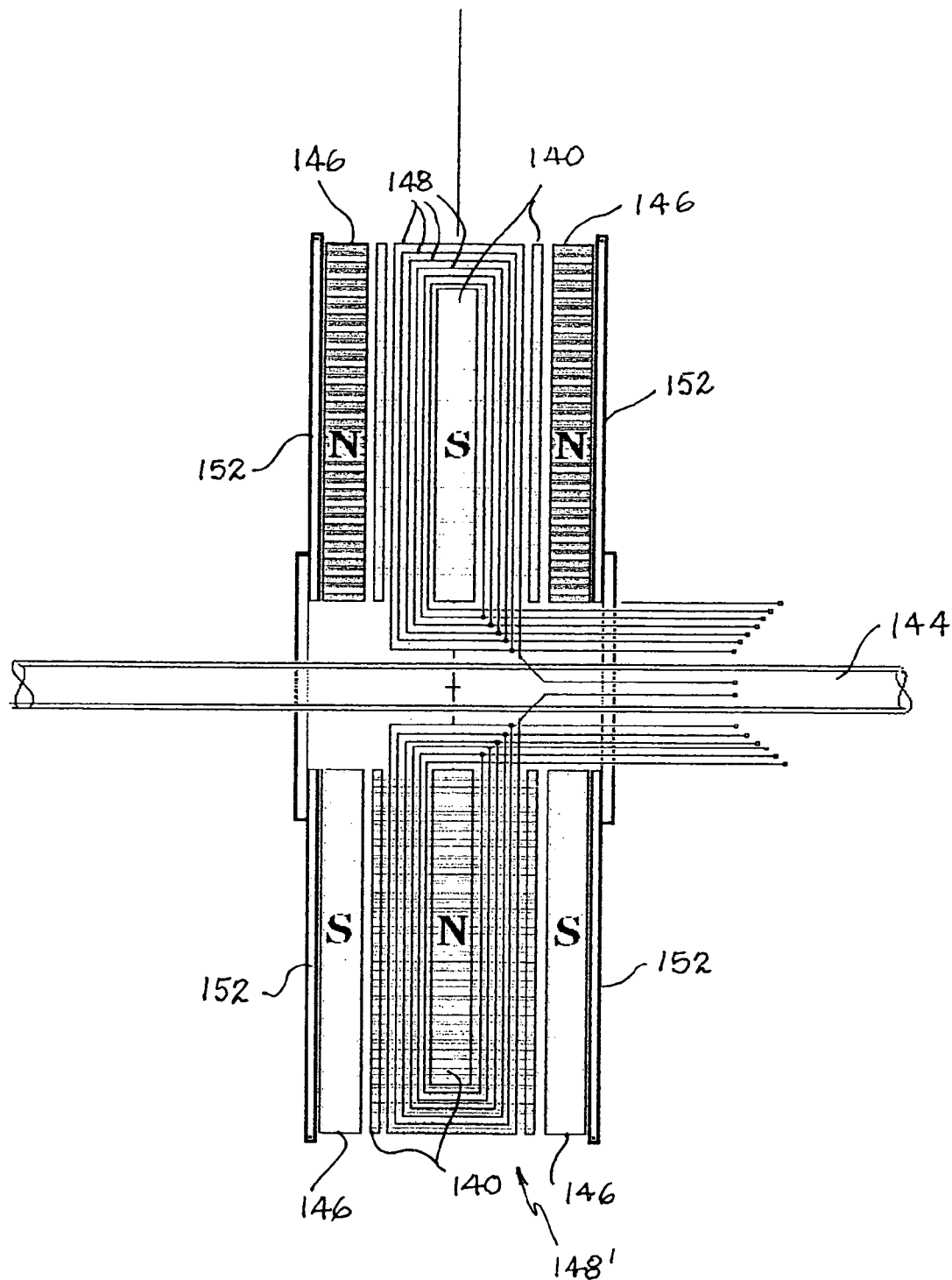
FIG. 1 is a schematic diagram of a cross section of the present apparatus showing opposing electromagnetic windings mounted on a rotor with taps taken from coils of the windings.

A rotating electromagnetic apparatus comprises a stator including a stator frame 152 supporting parallel spaced apart, disc-shaped permanent magnet sets, wherein each of the magnet sets comprises plural, spaced apart, co-planar magnet segments 146. The segments 146 are arranged with pairs of opposing N-N and S-S permanent magnet poles, as shown by the letters "S" for south pole and "N" for north pole, of opposite polarity in alternating circumferential sequence as is shown in FIG. 1. A rotor provides a magnetically permeable rotating rotor frame 140 mounted on, and rotating with, an axle 144 which is supported by the stator frame 152. The rotor frame 140 provides a plurality of radially oriented, toroidally wound coils 148 which are part of individual windings 148'. A current supplying commutator engages the rotor such that each of the coils 148 is accessible electrically.

Figure 2:
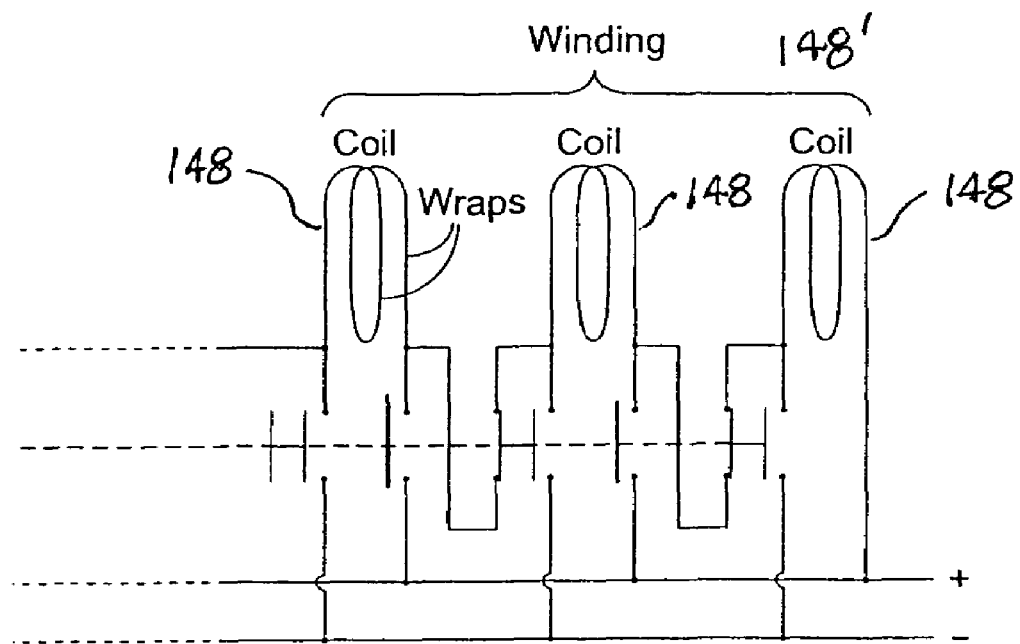
FIGS. 2 and 3 are schematic diagrams of one winding of a rotor of the present apparatus showing individual coils of the winding and a switching scheme for placing the coils in series and, or parallel interconnection.
Figure 3:
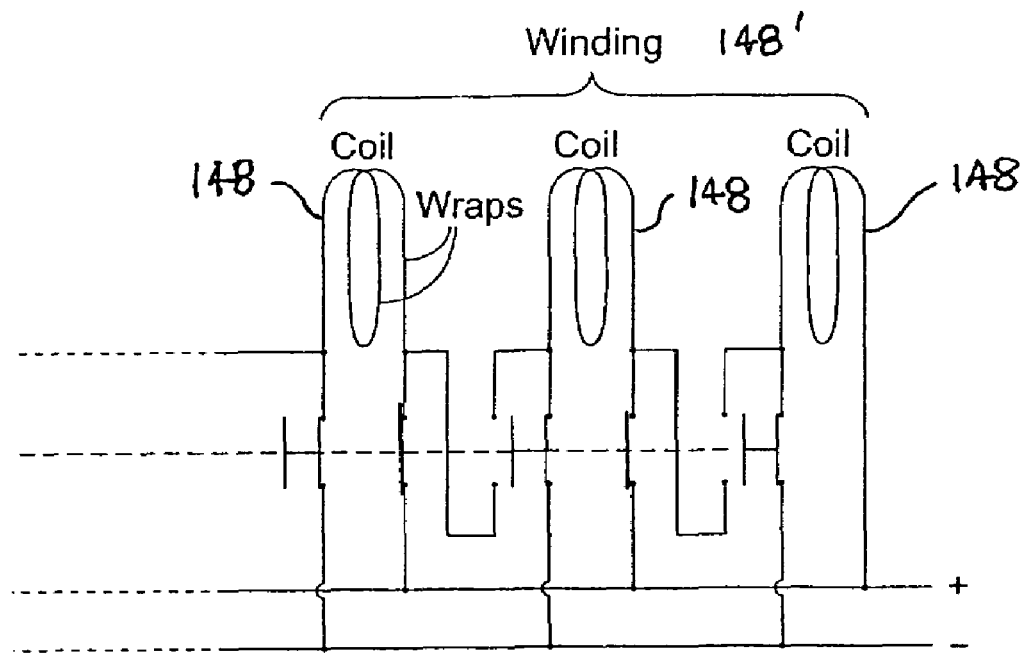
Figure 4:
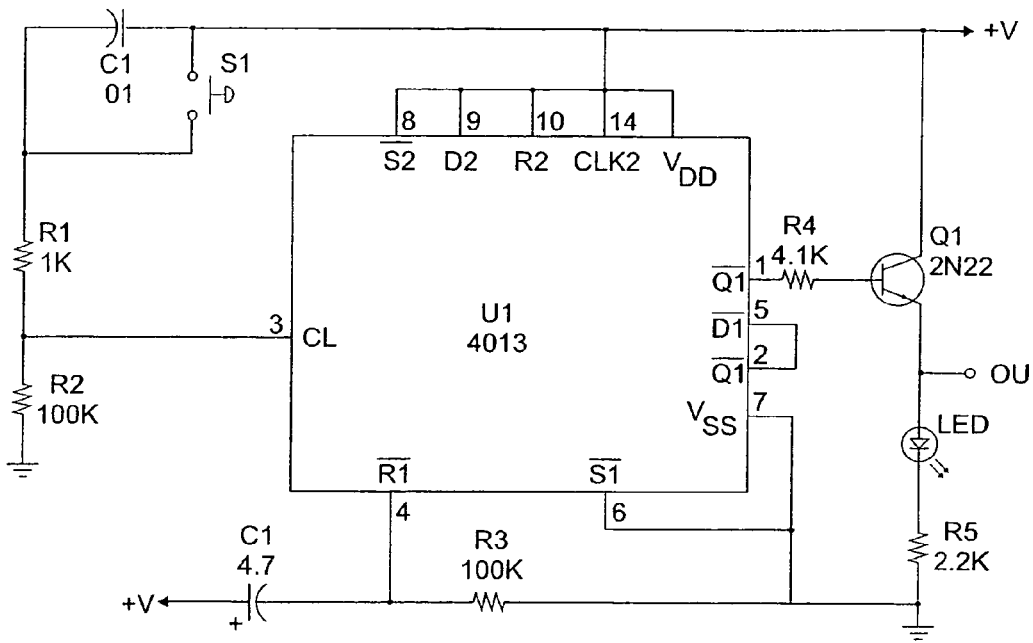
FIG. 4 is a schematic diagram of an electronic switch configuration of the present apparatus.

The permanent magnets 146 also referred to using the word "magnet" produce a magnetic field within a space between the stator frames 152. The ferromagnetic toroidal rotor frame 140 is rotationally mounted within the magnetic field. A plurality of windings 148' are wound radially on the rotor, the windings 148' each comprise a plurality of coils 148 and the coils each comprise at least one wrap, i.e., turn of the conductive wires that make up the windings. The coils 148 are interconnected through a switching network that is referred to herein by the name "switch," but which is made up of a plurality of electronic switches such as is shown in FIG. 4. The switch is positioned on the rotor and configured for placing each of the coils 148 within each winding 148' alternatively in one of electrical series connection as shown in FIG. 2; electrical parallel connection as shown in FIG. 3 or electrically isolated, i.e., when the contacts are not made for either series or parallel connection. Since the switches are preferably electronic as shown in FIG. 4, one switch is used for making each series connection and one switch is used for making each parallel connection. When a coil 148 is to be isolated, neither the series or parallel switches is made.

When the present apparatus is used as an electrical generator, clearly all of the coils 148 within each of the windings 148' may be placed in electrical series connection whereby the output voltage is maximized. Also, all of the coils 148 within each of the windings 148' may be placed in electrical parallel connection, whereby the output current is maximized. Further, within each of the windings, at least two of the coils 148 may be placed in electrical series connection, and, at the same time, at least two of the coils may be placed in electrical parallel connection, whereby a selected output voltage and current may be realized. As discussed, the output voltage and current are preferably fed through a commutator to an output terminal as is well known in the art. Control of the switches is enabled through the commutator as well.

Figure 5:
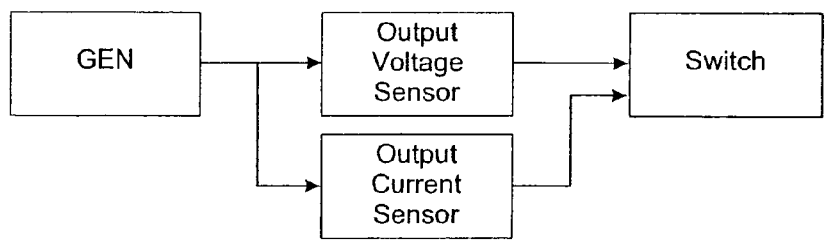
FIG. 5 is a block diagram of the generator embodiment thereof.

As shown in FIG. 5, output voltage and current sensors may be interconnected with the switch, for controlling the switch to produce constant output voltage or current depending upon load conditions.

When used as a motor the present apparatus may be switched to accept a range of input voltage and current conditions for rotating the rotor at a selected speed and torque. All of the coils 148 in each of the windings may be placed in electrical series connection whereby the output rotational speed is minimized, or in electrical parallel connection, whereby the output rotational speed is maximized. Clearly, any number of the coils 148 may be disconnected, whereby the output torque is selectable. Further, with at least two of the coils in electrical series connection, and, at the same time, at least two of the coils in electrical parallel connection, the output shaft rotational speed is selectable.

Figure 6:
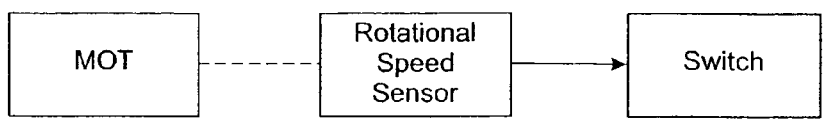
FIG. 6 is a block diagram of the motor embodiment thereof.

The input voltage and current are preferably fed to the rotor through a commutator from an input terminal in a manner similar to the generator enablement. As with the generator configuration, a rotational speed sensor may be interconnected with the rotor and the switch, for controlling the switch for a selected constant output speed and torque, as is shown in FIG. 6.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A rotating electromagnetic generator apparatus comprising: a pair of stators each providing a permanent magnet producing a magnetic field within a space between the stators; a ferromagnetic toroidal rotor rotationally mounted within the magnetic field; a plurality of windings wound radially on the rotor, the windings each comprising a plurality of coils and the coils each comprising at least one wrap, the coils interconnected through a switching network mounted on the rotor, the switching network configured for placing each of the coils within each winding alternatively in one of:
   a) electrical series connection;
   b) electrical parallel connection; and
   c) electrically isolated,
wherein, within each of the windings, at least two of the coils are in electrical series connection, and, at the same time, at least two of the coils are in electrical parallel connection, whereby a selectable output voltage and output current are produced by rotor rotation.

2. The apparatus of claim 1 wherein all of the coils within each of the windings are in electrical series connection whereby the output voltage is maximized.

3. The apparatus of claim 1 wherein all of the coils within each of the windings are in electrical parallel connection, whereby the output current is maximized.

4. The apparatus of claim 1 further comprising an output current sensor interconnected with the switching network, the sensor controlling the switching network for constant output current.

5. The apparatus of claim 1 further comprising an output voltage sensor interconnected with the switching network, the sensor controlling the switching network for constant output voltage.

6. A rotating electromagnetic motor apparatus comprising: a pair of stators each providing a permanent magnet producing a magnetic field within a space between the stators; a ferromagnetic toroidal rotor rotationally mounted within the magnetic field; a plurality of windings wound radially on the rotor, each of the windings comprising a plurality of coils and each of the coils comprising at least one wire wrap; the coils interconnected through a switching network mounted on the rotor, the switching network configure for placing each of the coils within each of the windings, alternatively in one of:
   c) electrical series connection with at least one further of the coils;
   d) electrical parallel connection with at least one further of the coils; and
   e) electrically isolated;
wherein at least two of the coils are in electrical series connection, and, at the same time, at least two of the coils are in electrical parallel connection, whereby the output speed is selectable;
whereby a range of input voltage and current conditions may be accommodated for rotating the rotor at a selected speed with a selected torque.

7. The apparatus of claim 6 wherein all of the coils in each of the windings are in electrical series connection whereby the output rotational speed is minimized.

8. The apparatus of claim 6 wherein all of the coils in each of the windings are in electrical parallel connection, whereby the output rotational speed is maximized.

9. The apparatus of claim 6 wherein a selected number of the coils in each of the windings is disconnected, whereby the output torque is selectable.

10. The apparatus of claim 6 further comprising a rotational speed sensor interconnected with the rotor and the switching network, the sensor controlling the switching network for a selected constant output speed and torque.

* * * * *